F. W. GURNEY.
APPARATUS FOR ASSEMBLING BALL BEARINGS.
APPLICATION FILED APR. 11, 1913.
1,232,293.
Patented July 3, 1917.
4 SHEETS—SHEET 1.
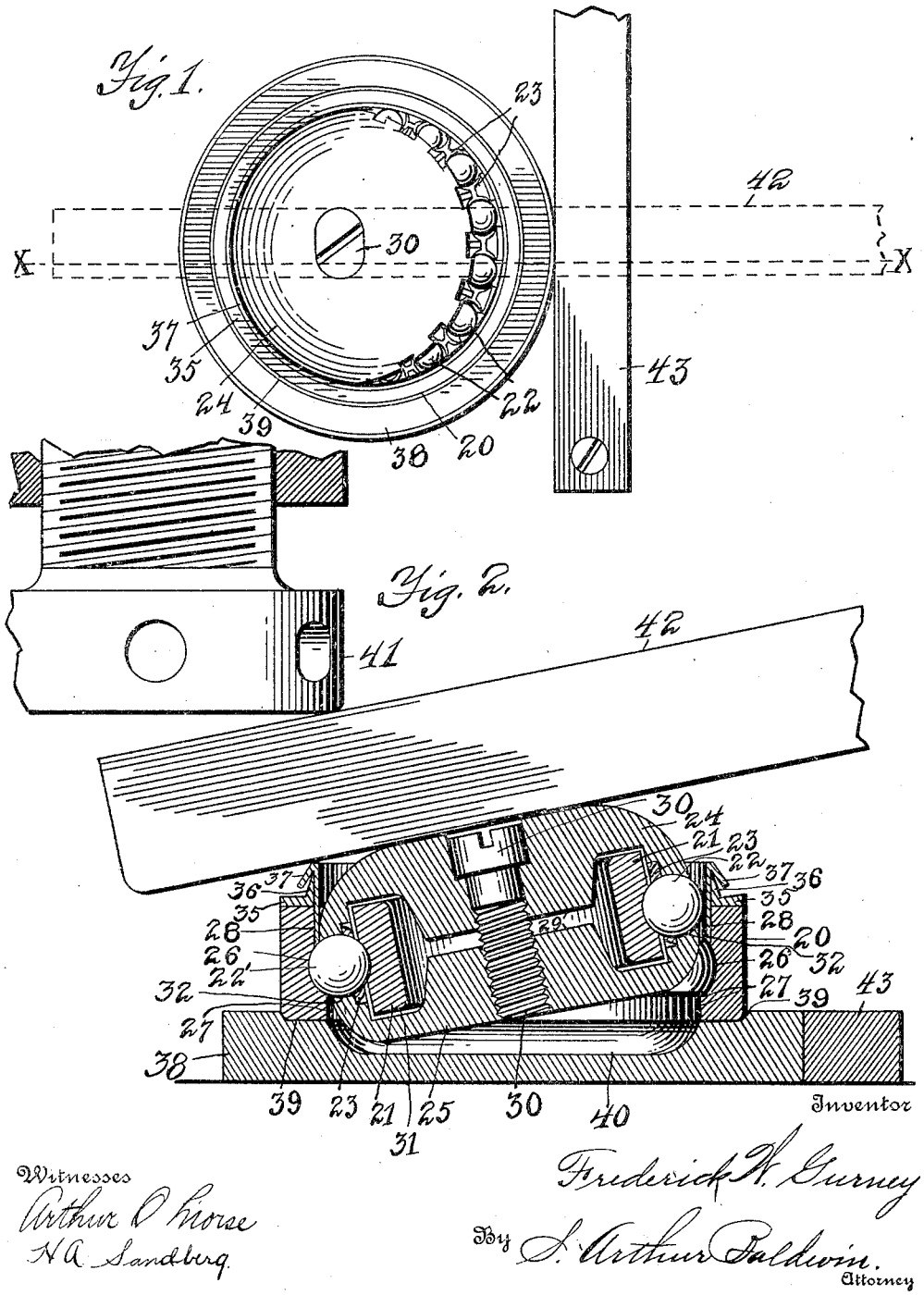

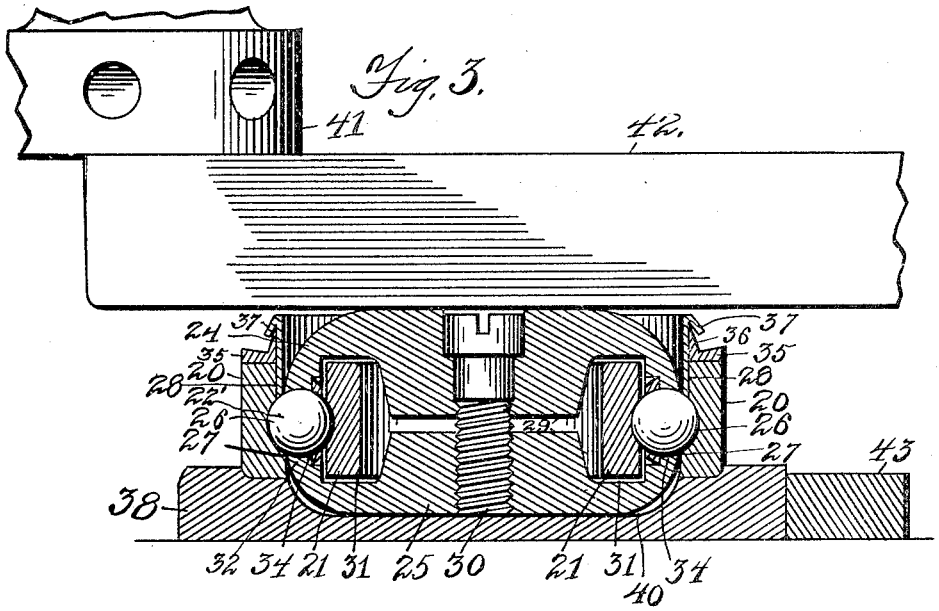
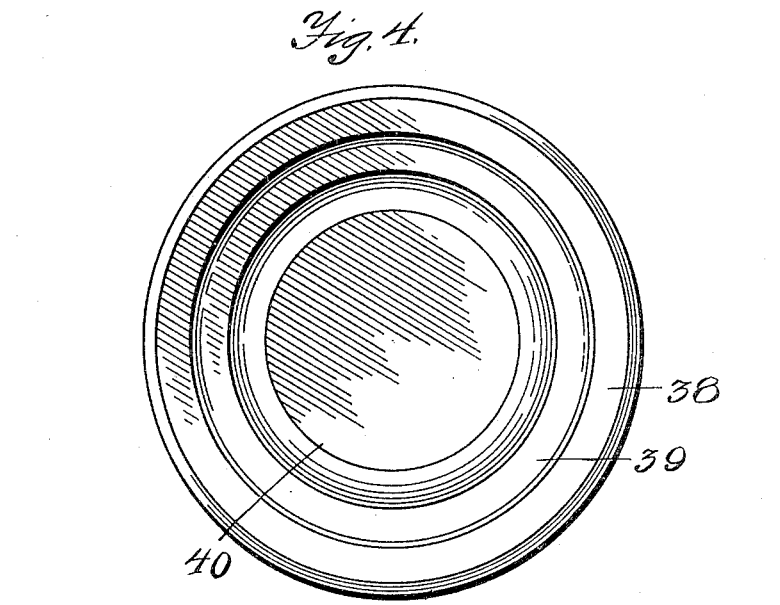

F. W. GURNEY.
APPARATUS FOR ASSEMBLING BALL BEARINGS.
APPLICATION FILED APR. 11, 1913.
1,232,293.
Patented July 3, 1917.
4 SHEETS—SHEET 3.
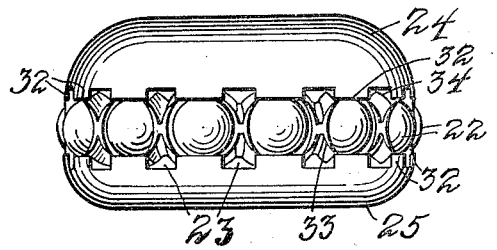
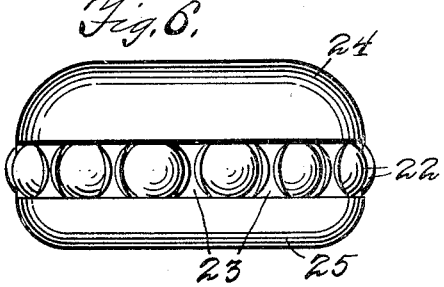
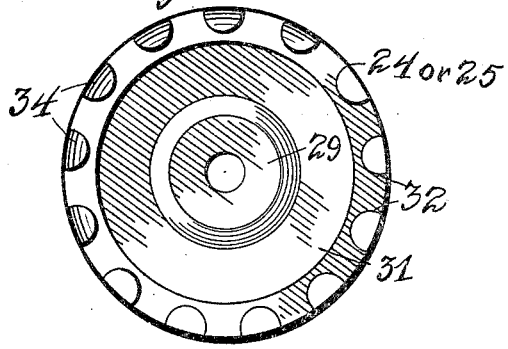

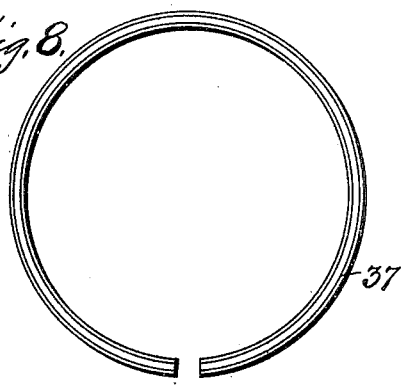
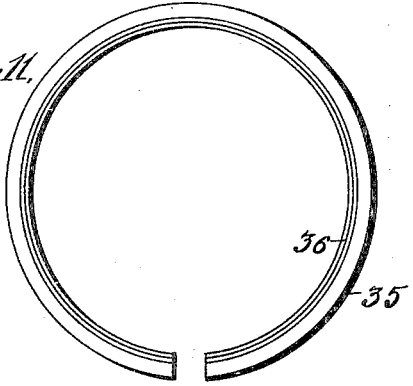
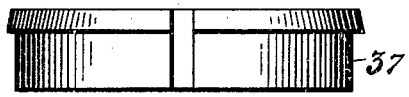
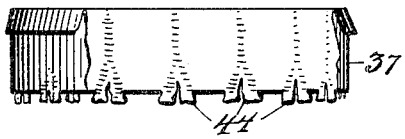
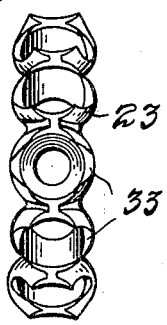
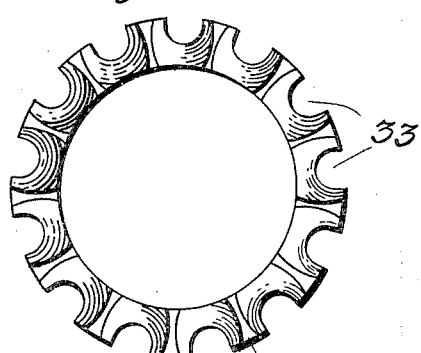

UNITED STATES PATENT OFFICE.

FREDERICK W. GURNEY, OF JAMESTOWN, NEW YORK, ASSIGNOR TO GURNEY BALL BEARING COMPANY, A CORPORATION OF NEW YORK.

APPARATUS FOR ASSEMBLING BALL-BEARINGS.

1,232,293. Specification of Letters Patent. Patented July 3, 1917.

Application filed April 11, 1913. Serial No. 760,337.

*To all whom it may concern:*

Be it known that I, FREDERICK W. GURNEY, a citizen of the United States, residing at the city of Jamestown, in the county of Chautauqua and State of New York, have invented certain new and useful Improvements in an Apparatus for Assembling Ball-Bearings, of which the following, taken in connection with the accompanying drawings, is a specification.

The invention relates to devices for assembling ball bearings and is a continuation in part of my method for assembling ball bearings as shown in my application filed January 28th, 1911, Serial No. 605,199; and the improvement consists in providing novel means for entering the balls into unbroken or continuous race grooves in the race rings without injury to said balls or race grooves or rings.

In the drawings, Figure 1 is a plan view of the ball bearing with the clamping plates and levers in position for assembling the balls in the races, the upper lever being shown in dotted lines and the ends of both levers are broken away; and Fig. 2 is a sectional view of said parts in the position shown at line X—X in Fig. 1 with an adjustable screw as a fulcrum for the end of the upper lever; and Fig. 3 is a sectional view at line X—X in Fig. 1, showing the bearing after it is assembled, the balls having entered the outer race but without the removal of the protective element and the support for the same, the levers being shown in the position which they would assume at the end of the assembling movement. Fig. 4 is a top plan view of the bed or stopping plate for supporting the clamp and race rings for assembling the ball bearings. Fig. 5 is a side elevation of the clamping plates with the inner ring, spacing ring and balls clamped therein ready for inserting in the outer ring; and Fig. 6 is a similar side elevation of a modification of the clamping plates with the inner spacing ring or separator and the balls clamped therein. Fig. 7 is a plan view of the inner side of one of the clamping cup plates showing the space for the inner ring and the castellated projections. Fig. 8 is a top plan view; and Fig. 9 is a side elevation of the curtain or shield which protects the balls and race rings in assembling the bearing; and Fig. 10 is an elevation of said protection curtain after use in assembling a bearing, a portion of the curtain being broken away to show the action of the balls on the inner side of the lower edge of said curtain in entering the race. Fig. 11 is a top plan view of the open hanger ring for holding said protective curtain above the race groove so that it protects the inner side of the race ring but can not enter the race groove. Fig. 12 is a perspective edgewise view of a spacing ring or separator for the balls with outwardly facing cup-shaped openings for the balls and sidewise openings to receive the projections on the inner faces of the clamping cups; and Fig. 13 is a side elevation of said separator or spacing ring, showing the series of sidewise openings to the ball cups.

Similar numerals refer to corresponding parts in the several views.

The numeral 20 designates the outer race ring and 21 the inner race ring. The numeral 22 designates the balls and 23 one form of spacing ring or separator for the balls.

A clamp is provided for assembling the inner ring, the spacing ring, and the balls, and for holding said parts firmly in position, so that they can not move from their assembled position, which clamp is composed of two clamping plates or cups 24 and 25 and a screw bolt 30. The clamping plates 24 and 25 are rounded on their outer surface so as to easily enter the outer race ring, being made sufficiently less in diameter than the inner side of the outer race ring 20 to permit of the balls 22 extending from the periphery of the clamp to engage the groove or race 26 in ring 20. The side 27 of race 26 is preferably made higher in order to provide an ample longitudinal thrust bearing for the balls 22, and the side 28 is made shallower to permit of the insertion of the balls into the race 26.

The inner faces of the clamping cup plates 24 and 25 are preferably formed with the central projections 29 through which the clamping bolt 30 extends with a clearance between them. The clamping bolt 30 has its head inset in the upper cup plate 24 so as to be out of the way of the lever and also that it may be readily released by the application of a screw-driver and the cup plate 24 removed. Outside of the inner projections 29 an annular groove 31 is provided to receive the inner ring 21 therein with adjusting space around the same. The inner faces 34 which bear against the outer curve of the ball are curved to fit firmly against said outer curve and hold the balls against the bottom of the race groove in ring 21, not permitting their outward movement. The spaces between the balls on said inner faces 34 of the cup plates are cut away to permit the insertion of the particular ball separator 23 herein shown. The cuts form spaced projections 32 which enter the sidewise openings 33 of the spacing ring 23, thereby holding the balls 22 firmly in place. In case no ball separator was used, or in case of the use of a ball separator of another type, it is obvious that these cuts may be dispensed with, as shown in the modification of the cup plates in Fig. 6, which construction greatly simplifies the cup plates 24 and 25.

A hanger ring 35 is provided which rests upon the upper edge of outer ring 20 in assembling the parts. The hanger ring 35 has an upright portion 36 with a thin upper edge in line with the inner face of the race ring 20. A protective curtain 37 is provided, which is preferably made of soft sheet metal, having a folded upper edge which hangs upon the thin vertical edge 36 of ring 35. The curtain 37 is made of sufficient width to hang down on the inner side of outer ring 20 as far as the upper edge of ball race 26.

A bed or stopping plate 38 is provided having a seat 39 thereon within which ring 20 sits firmly yet fits loosely. Within seat 39 plate 38 is cut away as shown at 40 to provide a stop for the under side of the clamping cup plate 25. The depth of the cutaway portion 40 is important since in assembling the bearing the balls 22 must not strike the lower edge 27 of the race groove 26. Hence the depth of the cutaway portion 40 must not be greater than the projection of said clamping cup plate 25 below the inner ring so that these parts will fit perfectly together and stop the downward movement of the balls 22 when they spring into the groove 26 before the balls 22 strike said lower edge 27.

The bearing is preferably assembled by manual pressure since the fitting of the different parts into place is better accomplished by means of the manual touch and control. Accordingly, for the purpose of assembling, an adjustable fulcrum 41 is provided, since adjustment is necessary for the height of different bearings. A lever 42 is provided to press the clamp containing the inner race ring 21 and spacer ring 23 and the balls 22 down into the outer race ring, as shown in Figs. 2 and 3, and a second lever 43 is provided by means of which the bed plate 38 and the parts bearing thereon may be held firmly against any outward movement from the lever 42 as it presses slightly forward in pressing down upon the clamped race ring and balls in assembling the bearing.

In the process of assembling, the inner ring 21, spacing ring 23 and balls 22 are clamped firmly within the cup plates 24 and 25 as hereinbefore described. The race ring 20 is heated as hot as permissible without softening or drawing the temper in order to give as much of expansion to said outer race ring as possible. The inner race ring 21 with the balls 22 and clamping plates 24 and 25 are kept as cold as possible in order to be in as great a state of contraction as possible. The hot ring 20 is placed on the bed plate 38 under the fulcrum 41 in the position shown in Fig. 2. The hanger ring 35 is placed on its upper edge with the curtain 37 thereon and extending down to the upper edge of groove 26; the assembled clamp cups 24 and 25 with ring 21 and balls 22 and spacing ring 23 therebetween and the balls 22 extending out therefrom are then quickly placed in the hot ring 20 in the position shown in Figs. 1 and 2. The balls 22' on the side toward the fulcrum 41 being thrust down into the bottom of the groove 26 of ring 20. The lever 43 is placed against the front edge of the bed plate 38 to hold the same firmly against forward movement and the end of lever 42 is then placed under the fulcrum 41 and the lever is pressed downward upon clamping plate 24 thereby forcing the projecting balls 22 progressively down inside the curtain 37 into the groove 26 pivoting on the ball or balls 22' as they move down and progressing toward the front side, the ring 20 springing and stretching to accommodate the forced entrance of the balls into groove 26.

The curtain 37 protects the balls 22 and the inner face of ring 20 and particularly the edge of its race way or groove 26 from damage, the soft metal of the curtain 37 being scored or scarred and drawn over the edge of said race way 26, as shown at 44 in Fig. 10, and forming a sort of cushion or yielding seat for the balls as they enter the groove 26 of the hot race ring 20. The balls are pressed partly through the curtain but are kept from injurious contact with the hardened race ring by said curtain, the soft metal of the curtain acting as a lubricant as it were for the hardened faces of the balls and race ring. The hot outer ring stretches somewhat in the operation. Accordingly a steel of high elasticity is desirable for outer ring 20 on this account.

As hereinbefore stated the cutaway portion 40 of bed plate 38 permits of the balls 22 entering the groove 26 but stops said balls in their downward movement before they strike the lower edge 27 of the race 26 and thereby injure said race and the balls from these hardened substances coming in contact under such heavy pressure. It is apparent that as the balls spring into place, the bottom of the clamp cup 25 strikes against bed plate 38 within the cutaway portion 40 and thereby stops said downward movement.

As hereinbefore stated, there is a clearance between the inner ring 21 and the clamping plates 24 and 25 within the groove 31, as shown in Fig. 2, with the balls clamped in the race groove in said ring 21, thereby holding said ring 21 in suspended relation to the clamping plates 24 and 25, thus the side pressure in assembling is exerted entirely upon the balls. The set of balls are thus free to assume a position of greatest contraction by always seeking the bottom of the race groove, for the inner race ring is free to adjust itself to the line of pressure on the balls. The side pressure is applied only to the balls and not to the ring in order that the balls may not be displaced from the bottom of the race groove in the inner ring and so increase the combined diameter of balls and inner ring.

It is apparent that the separator or spacing ring 23 with its outwardly facing ball cups forms an ideal separator for the balls and is applicable only to a ball-bearing assembled after this manner.

I claim as new:

1. In an apparatus for assembling a ball bearing having outer and inner race rings and balls therebetween, means for holding a race ring and the balls, means for pressing said race ring and the balls while so held and the other race ring together into the assembled position, and a stopping means attached to limit the movement of assembling to prevent injury to the race ways.

2. In an apparatus for assembling a ball bearing having outer and inner race rings and balls therebetween, an upper clamping plate, an under clamping plate, and means for securing said clamping plates together with a ring and balls clamped therebetween with the balls firmly held in the race groove of said ring, the outer peripheries of the balls extending beyond the peripheries of said clamping plates.

3. In an apparatus for assembling a ball bearing having outer and inner race rings and balls therebetween, an upper clamping plate, an under clamping plate, means for securing said clamping plates together with a ring and balls clamped therebetween, and a stopping means to limit the movement of said clamping plates in the operation of assembling.

4. In an apparatus for assembling a ball bearing, a clamp for one of the rings and the balls, said clamp holding said balls in the race groove of said ring, a support for the other ring, means for pressing the clamped ring and balls and said supported ring together into the assembled position, and a protective element between said supported ring and the balls.

5. In an apparatus for assembling a ball bearing having outer and inner race rings and balls therebetween, a clamp for the inner ring and balls, said clamp holding said balls in and around the race groove of said inner ring, a support for the outer race ring, and means for pressing said balls into the race groove in said outer ring, and a protective curtain between said balls and outer race ring while entering the same.

6. In an apparatus for assembling a ball bearing having outer and inner race rings and balls therebetween, a clamp adapted for holding the inner ring and balls, said balls projecting beyond the periphery of said clamp, a support for the outer race ring, a protective curtain between said balls and outer race ring, means for supporting said protective curtain that it may not be drawn into the groove in said outer race ring, and means for pressing said balls into the race groove in said outer ring.

7. In an apparatus for assembling a ball bearing having outer and inner race rings and balls therebetween, a clamp for said inner ring and balls, a hanger ring on said outer ring, a strip of sheet metal supported on said hanger ring, said strip of sheet metal extending down to the edge of the race groove of said outer ring, and means for pressing said clamped balls into the race groove in said outer ring.

8. In an apparatus for assembling a ball bearing having outer and inner race rings and balls therebetween, means for holding said inner ring and the balls and a support for said outer ring, a hanger ring on said outer ring, a strip of sheet metal folded over the upper edge of said hanger ring, said strip of sheet metal extending down to the edge of the race groove of said outer ring, and means for pressing the balls so held into the race groove in said outer ring.

9. In an apparatus for assembling a ball bearing having outer and inner race rings and balls therebetween, a clamp for said inner ring and balls, said clamp adapted to hold said balls with their peripheries extending beyond the periphery of said clamp, a support for said outer ring, a hanger ring on said outer ring, a strip of sheet metal supported on said hanger ring, said strip of sheet metal extending down to the edge of the race groove within said outer ring, a lever for pressing said balls into the race groove of said outer ring, and an adjustable fulcrum for said lever.

In testimony whereof I have affixed my signature in the presence of two witnesses.

FREDERICK W. GURNEY.

Witnesses:
H. A. SANDBERG,
ARTHUR O. MORSE.

Copies of this patent may be obtained for five cents each, by addressing the "Commissioner of Patents, Washington, D. C."